United States Patent

Smith et al.

Patent Number: 5,304,098
Date of Patent: Apr. 19, 1994

[54] ADJUSTABLE SHEAVE

[75] Inventors: Gregory J. Smith, Maysville; Harry T. Appleg, Tollesboro; Bill C. Reeder, Maysville, all of Ky.

[73] Assignee: Emerson Electric Co., St. Louis, Mo.

[21] Appl. No.: 967,771

[22] Filed: Oct. 28, 1992

[51] Int. Cl.⁵ ............................................. F16H 9/12
[52] U.S. Cl. ........................................ 474/25; 474/36
[58] Field of Search ............... 474/24, 25, 32–34, 474/36

[56] References Cited

U.S. PATENT DOCUMENTS

| | | | |
|---|---|---|---|
| 2,135,467 | 11/1938 | Metz | 474/36 |
| 2,172,230 | 9/1939 | Watson | 474/36 |
| 2,262,197 | 11/1941 | Otto et al. | 474/26 |
| 2,400,294 | 5/1946 | Firth et al. | 74/230.17 |
| 2,610,515 | 9/1952 | Williams | 474/36 X |
| 2,633,031 | 3/1953 | Browning | 74/230.17 |
| 2,890,592 | 6/1959 | Keepers | 74/230.17 |
| 3,043,151 | 7/1962 | Keepers | 74/230.17 |
| 3,782,211 | 1/1974 | Campbell et al. | 474/36 |
| 4,226,133 | 10/1980 | Hanke | 474/42 |

Primary Examiner—Ramon S. Britts
Assistant Examiner—Roger J. Schoeppel
Attorney, Agent, or Firm—Polster, Lieder, Woodruff & Lucchesi

[57] ABSTRACT

An adjustable sheave including at least one pair of annular belt grooves defining annular discoidal flange members relatively movable on an end threaded hub support through an annular adjusting ring threadedly mounted on the threaded hub support end, the adjusting ring including locking means cooperable with one of the pair of flange members to tighten and bind the threads of the adjusting ring to the engaged threads of the hub support end.

11 Claims, 2 Drawing Sheets

ADJUSTABLE SHEAVE

BACKGROUND OF THE INVENTION

The present invention relates to sheaves and more particularly to single or multiple groove sheaves having adjustable or variable pitch diameters and including adjustment and locking ring means.

Variable pitch sheaves of the type in which adjustment of relatively movable annular discoidal flanges are accomplished through an adjusting device coaxially located on a flange support hub are generally well known in the sheave art, attention being directed to the structural arrangement of an externally threaded nut threadedly disposed within an internally threaded nut which, in turn, is threaded to the end of a discoidal flange support hub, such arrangement being disclosed in U.S. Pat. No. 2,400,294, issued to D. Firth et al on May 14, 1946. Further attention is directed to U.S. Pat. No. 3,043,151, issued to H. R. Keepers on July 10, 1962, which teaches a variable pitch sheave which includes an adjustment ring and a locking ring with cap screws connecting the rings for joint rotary movement of the rings and to draw the rings together to effect a wedging and locking action between the ring threads and the threads on the hub. Finally, attention is directed to U.S. Pat. No. 2,633,031, issued to J. N. Browning on Mar. 31, 1953, which teaches a flattened hub and key arrangement; to U.S. Pat. No. 2,890,592, issued to H. R. Keepers on Jun. 16, 1959, which teaches aligning flanges, locking rings and hub keyways to receive keys and tightening screws passing through the locking rings and threaded in the flanges to cause the rings and flanges to clamp hub threads therebetween; and to U.S. Pat. No. 4,226,133, issued to M. S. Hanke on Oct. 7, 1980, which teaches a comparatively complex, cooperatively adjustable inner and outer hub means to support axially adjustable discoidal flanges with set screw means passing through aligned radial opening and slot means of the outer and inner hub means to engage a shaft extending through the inner hub means.

The present invention recognizing the comparatively large number of assembly parts required in these past arrangements and the comparative complexity in manufacturing and assembling such parts, provides a unique and novel adjustable sheave arrangement which is straightforward and economical to manufacture, assemble and maintain and which requires a minimum of parts both in single and multiple belt groove sheave arrangements. Further, the novel structure of the present invention permits for ready and easy adjustment of the sheave discoidal flanges and the enhanced locking of such discoidal flanges in a preselected position on a flange support hub to maintain a precise flange adjustment without the comparatively complex parts and tooling which has been required in the past.

Various other features of the present invention will become obvious to one skilled in the art upon reading the disclosure set forth herein.

BRIEF SUMMARY OF THE INVENTION

More particularly the present invention provides a unique adjustable sheave structure comprising: a rotatable central hub support adapted to be connected to a drive shaft to be driven thereby; at least one pair of annular discoidal flange members oppositely disposed on the hub support for rotation therewith, the discoidal flange members serving to define a belt groove therebetween with at least one annular discoidal flange member of the pair being axially shiftable relative the opposed discoidal flange member on the hub support to vary the breadth of the defined belt groove; a unitary annular adjusting ring member threadedly mounted on the rotatable central hub support for axial movement relative the hub support upon threaded rotation of the adjusting ring member about the hub support to effect shifting of at least one annular discoidal flange member of the pair of annular, mating discoidal flange members to vary the breadth of the defined belt groove; a retaining member operatively connecting the annular unitary adjusting ring member to one of the belt groove defining annular mating discoidal flange members; and, a locking means operatively connected with the annular unitary adjusting ring member to adjustably cooperate with one of the annular flange members to tighten and bind the threads of the annular unitary adjusting ring member relative the hub support to lock the annular unitary adjusting ring member in preselected position on the hub support.

It is to be understood that various changes can be made by one skilled in the art in one or more of the several parts of the novel structure disclosed herein without departing from the scope or spirit of the present invention.

BRIEF DESCRIPTION OF THE DRAWINGS

Referring to the drawings which disclose one advantageous embodiment of the present invention.

DETAILED DESCRIPTION OF THE DRAWINGS

Figure 1:
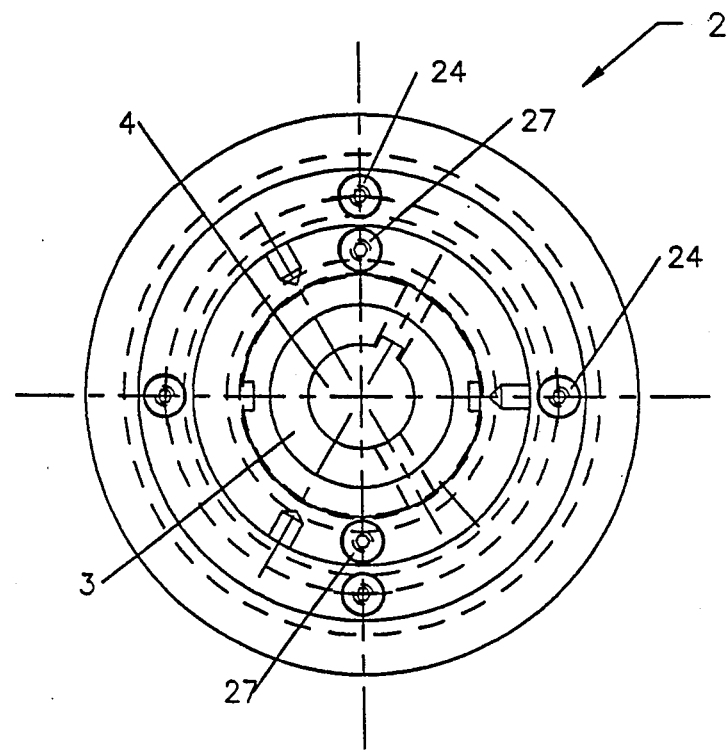
FIG. 1 is an end view of the inventive adjustable sheave.
Figure 2:
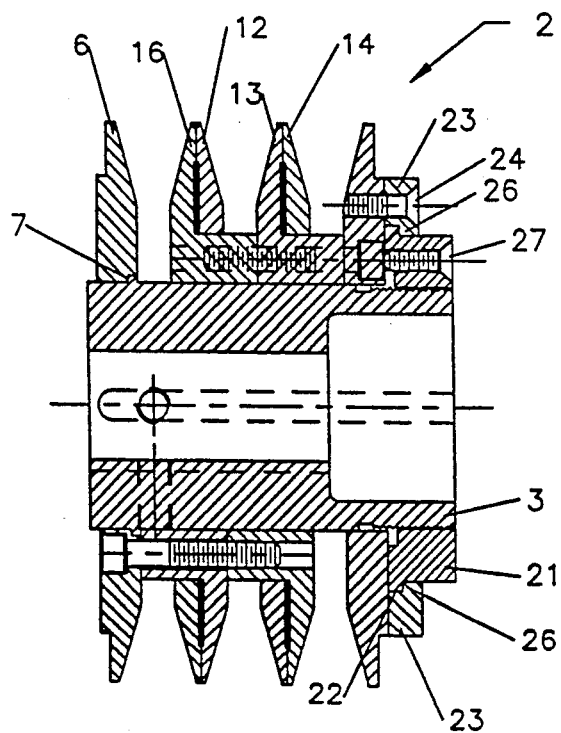
FIG. 2 is a cross-sectional view of the sheave of FIG. 1 taken in a plane through line 2—2 of FIG. 1; and, FIG. 3 is an exploded, isometric view of the several parts of the novel sheave of FIGS. 1 and 2.
Figure 3:
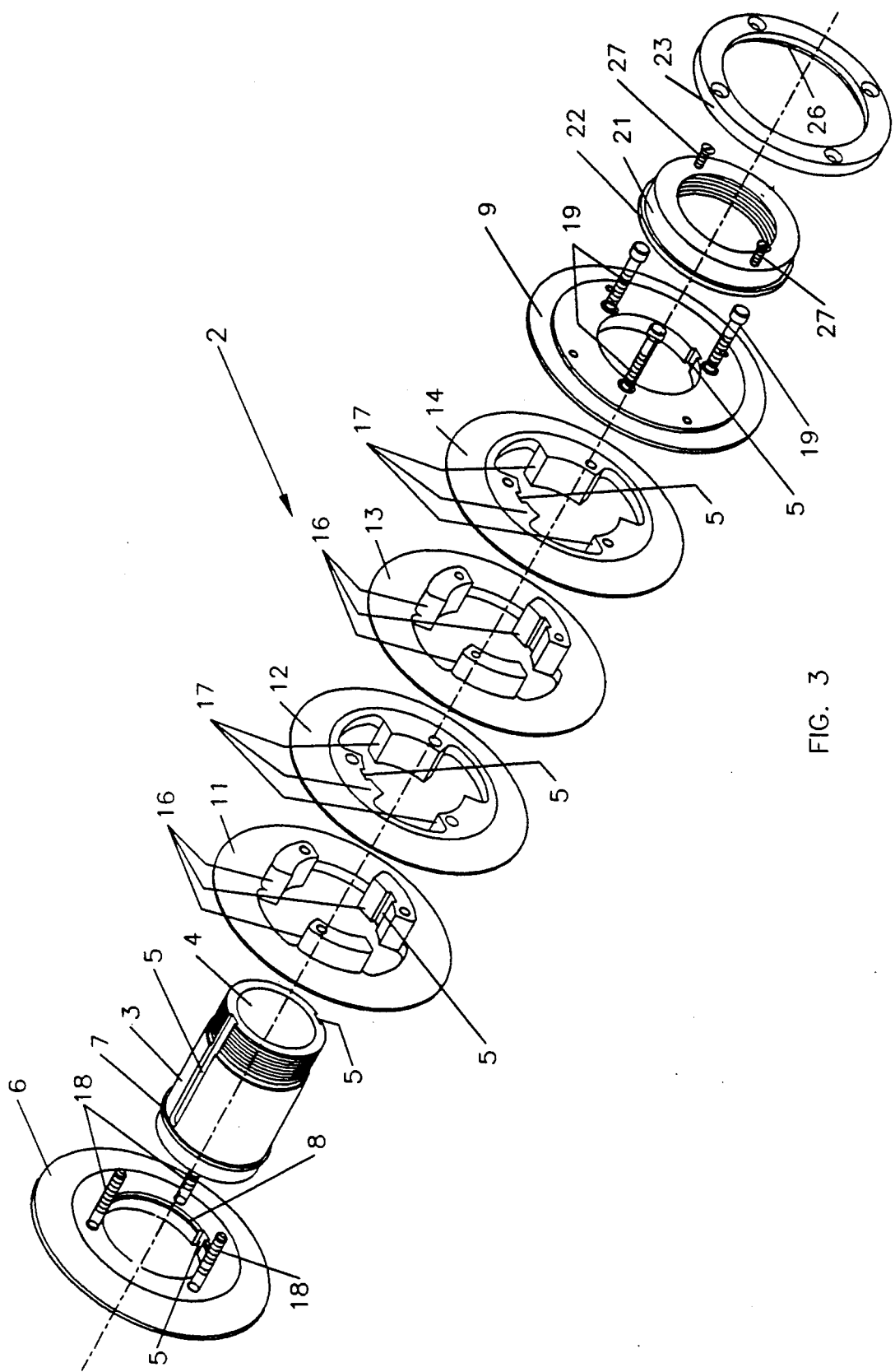

As can be seen in FIGS. 1-3 of the drawings, the novel adjustable sheave 2, includes a rotatable central hub support 3 which is internally bored as at 4 to receive and be keyed to a drive shaft (not shown). A first annular discoidal flange member 6 can be mounted to one extremity of the outer periphery of hub support 3 to be rotationally held and keyed along keyway 5 in set relation thereto for rotation therewith. It is to be noted that the outer periphery of hub support 3 is provided with a raised annular flange 7 which engagingly and matingly nests with an annular recess 8 in one face of annular discoidal flange member 6.

A second annular discoidal flange member 9 is mounted at the opposite extremity of hub support 3 to be in axially slidable relation with hub support 3, being rotationally held and slidably keyed along aligned corresponding keyways 5.

At least one pair of third and fourth annular discoidal flange members 11 and 13 are keyed to the hub support 3 in axially slidable and rotatable relation therewith through suitable longitudinally extending radial spaced keyways 5 and 5', with key members (not shown) engaging in immediately opposed radial offset mating keyways 5 and 5'. In this regard, it is to be noted that hub support 3 is provided with two keyways 5 and 5' which are radially positioned 180° apart with the correspondingly aligned opposed keyways 5 and 5' being on opposed pairs of annular discoidal flange members 11 and 12. In this regard, it also is to be noted in the unique, adjustable sheave disclosed in the drawings that a second pair of substantially similar, fifth and sixth annular discoidal flange members 13 and 14 are shown as keyed to the hub support 3 in axially slidable and rotatable relation therewith through the same suitable longitudinally extending key members (not shown) engaging in immediately opposed, radially spaced keyways 5 and 5'. Thus, providing three adjustable belt receiving grooves on hub support 3.

As can be seen in FIGS. 2 and 3 of the drawings, the pairs of interarranged mirror-image third and fourth annular discoidal flange members 11 and 12 and interarranged mirror-image fifth and sixth annular discoidal flange members 13 and 14, each include a set of three integral radially spaced lug spacer members 16 and 17, respectively. These lug spacer members extend axially parallel from their respective integral discoidal discs in surrounding spaced, parallel relation to hub support 3. The lug spacer member sets 16 and 17 extend in relative radially offset opposite directions from each other to engagingly intermesh as opposite sets to thus provide the cooperatively spaced discoidal flange members to form the aforedescribed three adjacent belt grooves on hub support 3. It is to be noted that a first set of three radially spaced screws 18 are threadedly mounted to pass through the axially fixed discoidal flange 6 mounted at one end of hub support 3 to threadedly connect annular discoidal flanges 12 and 14. A second set of three radially spaced screws 19 are threadedly mounted to pass in the opposite direction through the axially slidable second annular discoidal flange 9 mounted at the opposite end of hub support 3 to threadedly connect annular discoidal flanges 11 and 13. It also is to be noted that appropriate lug spacer members 16 on each discoidal flange 11 and 13 are provided with one of the aforedescribed keyways 5 to matingly align with corresponding longitudinally extending keyway 5 on hub support 3 and the radially spaced set of appropriate lug spacer members 17 on each discoidal flange 12 and 14 are provided with one of the aforedescribed keyways 5' mating with corresponding longitudinally extending keyway 5' radially offset 180° to the longitudinally extending keyway 5 on hub support 3.

To effect slidable adjustment of the three belt groove breadths shown through the intermeshing annular discoidal flange member pairs respectively connected to opposite end mounted annular discoidal flange members 6 and 9 respectively, fixed and axially slidably mounted respectively at opposite ends of hub support 3, as abovedescribed, a sole, independently operating annular adjusting ring 21 is threadedly mounted on the threaded end of hub support 3 adjacent the axially slidable discoidal flange member 9. Upon threaded rotation of adjusting ring 21 about the threaded end of hub support 3, end discoidal flange member 9 is caused to axially slide relative to hub support 3 as are the discoidal flange members and 13 connected thereto so as to adjust the three belt groove breadths.

As also can be seen in FIGS. 2 and 3 of the drawings, annular adjusting ring 21 has an integral radially annular lip portion 22 extending outwardly from the periphery thereof. An annular retaining ring member 23 fastened by radially spaced screws 24 to the face of axially slidable annular discoidal flange member 9 that is adjacent to hub support 3 end is provided with an integral annular lip portion 26 (FIG. 2) which extends inwardly from the periphery thereof and is positioned to be in overlapping relation with lip portion 22 on adjusting ring 21. A pair of radially spaced set screws 27, which are threadedly disposed in and pass through annular adjusting ring 21, have their ends adjustably engaged and abut the face of the second discoidal flange member 9, thus, uniquely serving to tighten and lock bind the threads of adjusting ring 21 with the threaded end of hub support 3.

From the above it can be seen that a unique, adjustable sheave structure is provided which can be readily and economically manufactured, assembled and maintained with a minimum of operational parts involved.

The invention claimed is:

1. An adjustable sheave comprising:
   a rotatable central hub support adapted to be connected to a drive shaft to be driven thereby;
   at least one pair of mating annular discoidal flange members oppositely disposed on said hub support for rotation therewith, said discoidal flange members serving to matingly define a belt groove therebetween with at least one annular discoidal flange member of said pair being axially shiftable relative said opposed discoidal flange member on said hub support to vary the breadth of said defined belt groove;
   a sole unitary annular adjusting ring member threadedly mounted on said rotatable central hub support for axial movement relative said hub support upon threaded rotation of said sole adjusting ring member about said hub support to effect shifting of at least one annular discoidal flange member of said pair of annular mating discoidal flange members to vary the breadth of said defined belt groove;
   a retaining member operatively connecting said unitary annular adjusting ring member to one of said belt groove defining annular mating discoidal flange members; and,
   a locking means extending parallel the rotational axis of said hub support and operatively connected with said sole annular unitary adjusting ring member to adjustably engage and abut in cooperative balanced relation with one of said annular mating discoidal flange members to tighten and lock bind the threads of said annular sole unitary adjusting ring member relative said rotatable central hub support to lock said annular unitary adjusting ring member in preselected position on said central hub support.

2. The adjustable sheave of claim 1, said locking means comprising a plurality of radially spaced set screws threadedly disposed in said sole annular unitary adjusting ring member with screw ends adjustably engaging and abutting with a face of one of said annular mating discoidal flange members to tighten and lockbind the threads of said sole annular unitary adjusting ring member through which said set screws threadedly pass.

3. The adjustable sheave of claim 1, said sole annular adjusting ring member effecting axial shifting of the annular discoidal flange member immediately adjacent thereto.

4. The adjustable sheave of claim 1, said retaining member being connected to said annular mating discoidal flange member immediately adjacent said sole adjusting ring member.

5. The adjustable sheave of claim 1, said locking means comprising a plurality of radially spaced set screws threadedly disposed in said sole annular unitary adjusting ring member with the screw ends adjustable engaging in abutting relation with a face of said annular discoidal flange member immediately adjacent said adjusting ring member to effect axial shifting of said discoidal flange member immediately adjacent thereto, said retaining member being connected to said immediately adjacent annular discoidal flange member.

6. The adjustable sheave of claim 1, said pair of belt groove defining annular mating discoidal flange members being one of at least two pairs of discoidal flange members including interarranged and oppositely axially shiftable spaced discoidal flange members cooperatively disposed to define at least two pairs of belt grooves.

7. The adjustable sheave of claim 6, said interarranged discoidal flange members being in adjacent mirror-image relationship with one discoidal flange member of each of such adjacent mirror-image discoidal flange members cooperatively disposed in forming one belt groove and the other cooperatively disposed in forming an adjacent belt groove.

8. The adjustable sheave of claim 7, said interarranged discoidal flange members each including sets of radially spaced spacer members extending axially parallel therebetween with one spacer member set of each of such adjacent mirror-image discoidal flange members cooperatively disposed in forming one belt groove extending axially parallel in one direction to abuttingly intermesh and engage with a radial offset spacer member set of a corresponding discoidal flange member extending axially parallel in an opposite direction and being cooperatively disposed in intermeshing relation and forming an adjacent belt groove;

said sole adjusting ring member serving to move one set of radially spaced spacer members sets on one discoidal flange member in one direction to engage with radially spaced spacer member of a set extending in the opposite direction.

9. The adjustable sheave of claim 8, said spacer members comprising radially spaced spacer lug sets integral with said discoidal flange members with the radially spaced spacer lugs of one discoidal flange member set of a pair of belt groove defining flange members being oppositely disposed and offset with the radially spaced spacer lug sets of the opposite flange member to allow opposed spacer lug intermeshing.

10. An adjustable sheave comprising:
a rotatable central hub support internally bored to receive and be keyed to a drive shaft therefor;
a first annular discoidal flange member mounted to one extremity of said hub support to be held in set relation thereto for rotation therewith;
a second annular discoidal flange member mounted to the opposite extremity of said hub support in axially slidable and rotatable rotation therewith;
at least one pair of interarranged third and fourth discoidal flange members keyed to said hub support in axially slidable and rotatable relation therewith, between said first and second discoidal flange members, said pair of interarranged third and fourth discoidal flange members being in adjacent mirror-image relation with each including projecting radially spaced lug spacer member sets extending axially parallel therefrom in relative radially offset directions from each other to engage and intermesh to provide cooperatively spaced discoidal flange members to form adjacent belt grooves therebetween on said hub support with one of said pair of flange members being connected to said first annular discoidal flange member at one end of said hub support and the other of said pair of flange members being connected to said second discoidal flange member at the other end of said hub support; and a sole, independently operating annular adjusting ring threadedly mounted on said hub support adjacent said axially slidable discoidal flange member adjacent one end of said hub support to effect slidable adjustment thereof and the intermeshing annular discoidal flange member connected thereto upon threaded rotation of said adjusting ring about said hub support to adjust belt groove breadths, said adjusting ring including a radially extending annular lip portion extending outwardly from the periphery thereof; and a sole annular retaining ring member fastened to the face of said second discoidal flange member adjacent said hub support end, said retaining ring member having an annular lip portion extending inwardly from the periphery thereof in overlapping relation with the annular lip portion of said annular adjusting ring; a pair of annularly spaced set screws threadedly disposed in and passing through said annular integral adjusting ring parallel and equally spaced from the rotational axis of said hub support with the ends thereof adjustably abutting the face of said second discoidal flange member to tighten and bind the threads of said sole adjusting ring with the threaded hub support end.

11. The adjustable sheave of claim 10, and at least a fifth and sixth interarranged annular discoidal flange member pair matingly corresponding to said third and fourth interarranged discoidal flange member pair also axially slidably and rotationally positioned on said hub support with respect to said first and second discoidal flange members and similarly connected thereto to provide at least a third adjustable belt groove on said hub support.

* * * * *

UNITED STATES PATENT AND TRADEMARK OFFICE
CERTIFICATE OF CORRECTION

PATENT NO. : 5,304,098
DATED : April 19, 1994
INVENTOR(S) : SMith et al.

It is certified that error appears in the above-indentified patent and that said Letters Patent is hereby corrected as shown below:

On title page, item
[75] Inventors: "Appleg" should be -- Applegate--

Column 3, line 56, delete "to"
Column 3, line 57, after "members" insert -- 11 --
Column 4, line 68, delete "adjustable" and insert -- adjustably --
Column 6, line 13, after "offset" insert -- opposite --.

Signed and Sealed this

Sixth Day of September, 1994

Attest:

BRUCE LEHMAN

*Attesting Officer*     *Commissioner of Patents and Trademarks*